3,481,673
OPTICAL COMPARISON SYSTEMS
Robin John Freeman, Woking, England, assignor to Vision Engineering Limited, Woking, England
Filed June 1, 1966, Ser. No. 554,433
Claims priority, application Great Britain, June 22, 1965, 26,316/65
Int. Cl. G01b 11/24; G02b 27/14, 21/18
U.S. Cl. 356—168     3 Claims

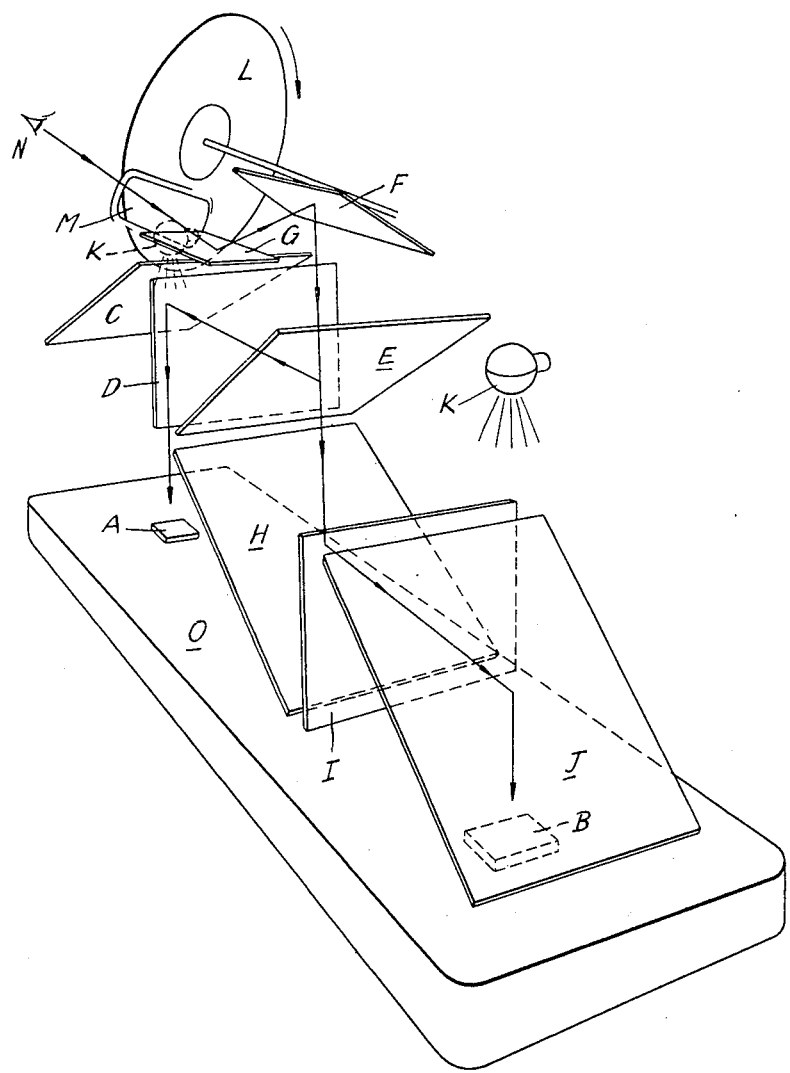

ABSTRACT OF THE DISCLOSURE

The differently polarized light rays from the views of a master article and a reproduction thereof are combined into a single light beam by means of several semi-reflective mirrors and a reflecting mirror so that the light rays from each view suffers substantially the same reduction in intensity. A rotating analyzer disc is placed in the path of the single light beam so that the superimposed views are observed alternately.

---

This invention concerns systems for optical comparison between a perfectly finished assembly or article and a similar newly made assembly or article.

The optical comparison system of this invention is especially suitable for use with complex assemblies, such as printed circuit panels which may include hundreds of electronic components, though the system is designed to reduce eye strain in the comparison of any master product and a reproduction thereof.

Conventionally, the master product and its reproduction are viewed side by side and the checker's eyes have to shift many times between the one and the other.

According to the invention, from one aspect, I provide an optical comparison system in which differentially polarised images of a master assembly or article and a reproduction thereof are transmitted to a common viewing point through the medium of an analyser arranged to transmit the images of master and reproduction alternately.

From another aspect, the invention provides an optical comparison system in which a master article and a reproduction thereof are similarly illuminated and images of both are transmitted by a reflector system to a common viewing point, the light path of one image being passed through a polarising plate in one plane and the light path of the other image being passed through a polarising plate giving polarisation in a plane at right angles to that of the first, and in which a rotating analysing disc in the light path of both images to the viewing point is arranged to pass one image after the other to the eye of an observer.

Where the articles to be compared are small, lens systems can be introduced to provide magnified images at the viewing point. Conversely, where the articles are large they may be mounted on linked movable tables and be scanned under the instrument.

In preferred systems according to the invention semi-reflective mirrors are used in the illuminating paths to the articles to be compared and in the optical path to the viewing point, the passages of light through the mirrors and reflected thereby being kept equal so that the intensity of illumination at the viewing point is substantially constant whichever article is being viewed.

The analyser, which is conveniently comprised by a rotating disc, is preferably fitted with a variable gear so that the time of viewing of the master and its reproduction can be varied at will.

The above and other features of the invention are embodied in the following description of one preferred construction of apparatus which will now be given as an example with reference to the accompanying drawing which is a diagrammatic perspective view.

A table O on which the apparatus is mounted provides stations A and B for location of a master product and a reproduction thereof.

Lamps K of similar power are mounted vertically above each station.

The light from each lamp passes downwardly through a semi-silvered mirror C and J angled at 45° to the table top to provide true vertical illumination of the master product and the copy.

The image of one article, say the master product located at station A, is reflected from the lower surface of the semi-silvered mirror C directly above it to pass parallel to the table surface through a vertical polarising plate D. The polarised image is further reflected by a second semi-silvered mirror E angled at 45° to the table surface to pass vertically upwards to be further reflected by a pair of fully silvered erecting mirrors F and G and pass through the viewing aperture M of a rotatable analysing disc L to a viewing point N.

The image path in this case has involved two reflections at semi-silvered mirrors.

The image of the other article at station B is likewise reflected by the semi-silvered mirror J directly above it to pass through a second polarising plate I which gives polarisation in a plane at right angles to that first mentioned.

A fully reflective mirror H diverts the image path vertically upwards through the semi-silvered mirror E by which the polarised image of the master product was reflected vertically upwards, and thereafter the polarised image of the copy article follows the same path as that of the master product to the viewing point.

The image path in this case has included one reflection at a semi-silvered mirror and one passage through a semi-silvered mirror, so that the loss of illumination is comparable to that in the first case.

The analyser disc L is driven through a reduction gear by an electric motor with variable speed control (not shown) and has alternate areas for analysing the oppositely polarised images, which are thus received one after the other at the viewing point with substantially constant level of illumination and consequent reduction of eye strain.

Lens systems for providing magnified images of small articles and mechanism for moving the tables on which large articles are mounted for scanning portions thereof are conventional and have been omitted from the drawing.

I claim:
1. An optical system for comparing a master article and a reproduction thereof comprising, in combination,
   support means for receiving the master article and the reproduction,
   means for illuminating the master article and the reproduction,
   means for combining the rays from the master article and the reproduction into a single light beam,
   means for polarizing the rays from the master article, before combining the rays, in one plane,
   means for polarizing the rays from the reproduction, before combining the rays, in a plane at right angles to that of the first plane,
   an analyzing disc disposed within the path of said single light beam, said disc having discrete portions thereof for alternately passing only the rays from the master article and then only the rays from the reproduction,
   and means for rotating said disc whereby superimposed views of the master article and the reproduction are alternately observed.

2. The optical system according to claim 1 wherein said means for combining said rays comprises a semi-reflective mirror between said illuminating means and the master article, a semi-reflective mirror between the illuminating means and the reproduction, a reflecting mirror in the path of the light beam from one of the articles, and a semi-reflective mirror in the path of the light beam from the other article, the last mentioned semi-reflective mirror and the reflecting mirror being arranged to effect the combination of the two views into a single light beam, whereby the light ray from one suffers semi-reflection twice while the light rays from the other of said articles suffers one semi-reflection and one passage through a semi-reflective mirror so that the intensities of the light rays from the two articles, when combined, are substantially equal.

3. The system according to claim 1 wherein said drive means is effective to vary the speed of rotation of said disc whereby the time of viewing each article may be varied at will.

References Cited

UNITED STATES PATENTS

| | | |
|---|---|---|
| 2,123,743 | 7/1938 | Pratt. |
| 2,427,256 | 9/1947 | Butscher. |
| 2,450,761 | 10/1948 | Mac Neille _ _ _ _ _ _ 350—153 XR |
| 2,765,704 | 10/1956 | Motta. |
| 3,055,261 | 9/1962 | Braun et al. |
| 3,283,071 | 11/1966 | Rose et al. |

OTHER REFERENCES

Vectrograph Stereograms, B. Dudley, Photo-technique, May 1941, pp. 30–32.

Comparison System for Microscope Images, Pope et al., Review of Scientific Instr., vol. 37, No. 3, March 1966, pp. 377–378.

JEWELL N. PEDERSEN, Primary Examiner

T. MAJOR, Assistant Examiner

U.S. Cl. X.R.

350—30, 159, 174